United States Patent
Enomoto et al.

(10) Patent No.: US 7,613,332 B2
(45) Date of Patent: Nov. 3, 2009

(54) PARTICULAR-REGION DETECTION METHOD AND APPARATUS, AND PROGRAM THEREFOR

(75) Inventors: Jun Enomoto, Kanagawa (JP); Takafumi Matsushita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1000 days.

(21) Appl. No.: 11/094,239

(22) Filed: Mar. 31, 2005

(65) Prior Publication Data

US 2005/0220347 A1    Oct. 6, 2005

(30) Foreign Application Priority Data

Mar. 31, 2004 (JP) .............................. 2004-105711

(51) Int. Cl.
  *G06K 9/00* (2006.01)
  *H04N 7/18* (2006.01)
(52) U.S. Cl. ...................... 382/115; 382/103; 382/162; 348/61; 348/77; 348/152
(58) Field of Classification Search ................ 382/103, 382/115–118, 162–167; 348/61, 77–78, 348/143, 152, 155, 158, 207.99
See application file for complete search history.

(56) References Cited

U.S. PATENT DOCUMENTS

| 5,629,752 | A | 5/1997 | Kinjo |
| 5,930,391 | A | 7/1999 | Kinjo |
| 6,445,819 | B1 * | 9/2002 | Kinjo ........................ 382/173 |
| 7,116,820 | B2 * | 10/2006 | Luo et al. .................... 382/167 |
| 7,155,037 | B2 * | 12/2006 | Nagai et al. ................. 382/118 |
| 7,343,028 | B2 * | 3/2008 | Ioffe et al. ................... 382/118 |
| 7,409,091 | B2 * | 8/2008 | Sung et al. .................. 382/191 |
| 2003/0044177 | A1 * | 3/2003 | Oberhardt et al. ........... 396/158 |
| 2004/0213476 | A1 | 10/2004 | Luo et al. |

FOREIGN PATENT DOCUMENTS

| JP | 8-184925 A | 7/1996 |
| JP | 9-138471 A | 5/1997 |

(Continued)

OTHER PUBLICATIONS

Japanese Notification of Reasons for Refusal, dated Dec. 24, 2008, issued in corresponding JP application no. 2004-105711, 5 pages with partial English translation.

*Primary Examiner*—Daniel G Mariam
*Assistant Examiner*—Manav Seth
(74) *Attorney, Agent, or Firm*—Sughrue Mion, PLLC

(57) ABSTRACT

In the invention, a particular-region such as red-eye region of a photographed image is detected, the image including a person as an object. At first a particular region candidate satisfying detection conditions for the particular region candidate is detected from the image. Then, a face region of the person satisfying detection conditions for the face region of the person is detected and the particular region candidate is specified as a particular region to be detected, in a condition that the particular region candidate is included in the detected face region. On the other hand, the image is divided into first and second regions at least before the detecting of the face region of the person. The detection conditions used for the detection for the particular region candidate or the detection for the face region of the person are changed between the first region and the second region of the image.

17 Claims, 4 Drawing Sheets

FOREIGN PATENT DOCUMENTS

| | | |
|---|---|---|
| JP | 2000-137788 A | 5/2000 |
| JP | 2000-148980 A | 5/2000 |
| JP | 2000-149018 A | 5/2000 |
| JP | 2004-326805 A | 11/2004 |

* cited by examiner

PARTICULAR-REGION DETECTION METHOD AND APPARATUS, AND PROGRAM THEREFOR

BACKGROUND OF THE INVENTION

The present invention belongs to a technology field of image processing for detecting a particular region such as a red eye likely to be present in its face region from an image photographed on a photographic film or an image including a person photographed as an object by a digital camera. In particular, the present invention relates to a method and apparatus for detecting a particular region which enable high speed detection of a red eye or the like from an image, and a program for implementing the same.

There has recently been put to practical use a digital photoprinter for photoelectrically reading an image recorded on a film, converting the read image into a digital signal, subsequently executing various image processing operations to convert the digital signal into image data for recording, executing photosensitive material exposure by a recording light modulated in accordance with the image data, and outputting the image as a print.

In the digital photoprinter, the image photographed on the film is photoelectrically read, the image is converted into the digital image data, and the image processing and the photosensitive material exposure are executed. Accordingly, prints can be created from not only the image photographed on the film but also the image (image data) photographed by the digital camera or the like.

With recent popularization of a personal computer (PC), a digital camera, and an inexpensive color printer such as an ink-jet printer, many users capture images photographed by the digital cameras in their PC's, carry out image processing, and output the images by the printers.

Additionally, there has recently been put to practical use a printer for directly reading image data from a storage medium storing an image photographed by a digital camera, executing predetermined image processing, and outputting a print (hard copy). Examples of the storage medium include a magneto-optical recording medium (MO or the like), a compact semiconductor memory medium (Smart Media™, Compact Flash™ or the like), a magnetic recording medium (flexible disk or the like), or an optical disk (CD, CD-R, or the like)

Incidentally, in an image that contains a person of a portrait or the like as an object, a most important factor to determine the image quality is a finished appearance of the person. Thus, a red-eye phenomenon is a serious problem in that eyes (pupils) of the person become red because of an influence of stroboscopic emission during photographing.

In the conventional photoprinter that directly executes exposure from the film, red-eye correction is very difficult. However, in the case of the digital image processing of the digital photoprinter or the like, red eyes are detected by image processing (image analysis), and the red eyes can be corrected by correcting luminance or chroma of the red-eye regions.

As a method of detecting red eyes from an image when the red-eye correction process is carried out, for example, there is a method of detecting a face from an image by image data analysis, and then detecting eyes or circular round regions constituting red eyes from the detected face. There have also been proposed various face detection methods used for the red-eye detection.

For example, JP 2000-137788 A discloses a method of improving accuracy of face detection as described below. A candidate region assumed to correspond to a face of a person is detected from an image, this candidate region is divided into a predetermined number of small blocks, a feature amount regarding frequency or amplitude of a change in density or luminance is obtained for each small block, and the feature amount is collated with a pattern indicating a feature amount for each of small blocks which are obtained by dividing the precreated region corresponding to the face of the person into the predetermined number. Accordingly, it is possible to improve the accuracy of the face detection by evaluating the degree of assurance that the face candidate region is a face region.

As another example, JP 2000-148980 A discloses a method of improving accuracy of face detection. At first, a candidate region assumed to correspond to a face of a person is detected from an image, next, a region assumed to be a body is set by using the face candidate region as a reference when a density of the face candidate region is within a predetermined range, and then the degree of assurance of a detection result of the face candidate region is evaluated based on presence of a region in which a density difference between the set body region and the face candidate region is equal to/less than a predetermined value, or based on contrast of density or chroma between the face candidate region and the body candidate region. Accordingly, it is possible to improve the accuracy of the face detection.

Furthermore, JP2000-149018 A discloses a method of detecting candidate regions assumed to correspond to faces of persons from an image by various detection analyses, obtaining a degree of overlapping of one among the detected candidate regions with the other candidate region in the image, and evaluating a region of a higher degree of overlapping to be higher in the assurance of a face region. Accordingly, it is possible to improve the accuracy of the face detection.

The face detection requires accuracy, and various analyses are necessary. Thus, ordinarily, the face detection must be performed in high-resolution image data (so-called fine scan data in the case of image data read from a film, or photographed image data in the case of the digital camera) used for outputting a print or the like, and that causes a lot of time for detection.

Besides, there can be basically four directions of a face in a photographed image depending on orientation of a camera (horizontally oriented and vertically oriented positions and the like) during photographing. Here, if face directions are different, arraying directions of an eye, a nose, and the like naturally vary in vertical and left-and-right directions of the image. Thus, to reliably detect the face, face detection must be performed in all the four directions in the image.

There are various face sizes in the image depending on object distances or the like. If face sizes are different in the image, a positional relation (distance) between an eye, a nose, and the like naturally varies in the image. Thus, to reliably detect the face, face detection must be performed corresponding to various face sizes.

As a result, the red-eye correction process takes much time because the red-eye detection, especially the face detection, is subjected to rate-controlling. For example, in the case of the digital photoprinter, high-quality images of no red eyes can be stably output, but the long process time is a major cause for a drop in productivity.

SUMMARY OF THE INVENTION

The present invention has been made to solve the problems inherent in the conventional art, and objects of the present invention are to provide a method of detecting a particular region, capable of detecting particular regions likely to be present in a face region of an image such as red eyes or eye corners in the image at a high speed, stably outputting high-quality images of no red eyes for example, and greatly improving printer productivity, an apparatus for detecting a particular region which implements the method, and a program for executing the method.

The present invention provides a particular-region detection method of detecting a particular region from an image including a person as an object. The method comprises: detecting a region of the image satisfying detection conditions for particular region candidates as the particular region candidate; detecting a face region of the person satisfying detection conditions for the face region of the person and specifying the particular region candidate as a particular region to be detected, in a condition that the particular region candidate is included in the detected face region; and dividing the image into first and second regions at least before the detecting of the face region of the person, wherein at least one of the detecting of the particular region candidate and the detecting of the face region of the person comprises changing the detection conditions used in the detecting between the first and second regions of the image.

In the invention, it is preferable that the image is divided into the first and second regions before said detecting of the particular region candidate; and the detecting of the particular region candidate comprises changing the detection conditions used in the detecting between the first and second regions of the image.

The particular region may comprise a red-eye region.

The first region may comprise a predetermined center region of the image; and the second region may comprise a peripheral region located around the center region.

Alternatively, the first region may be set in a focused region; and the second region may be set in an unfocussed region.

Alternatively, the first region may be set in a region in which luminance of the image exceeds a threshold value; and the second region may be set in a region in which luminance of the image is equal to or less than the threshold value.

It is also preferable that the particular region candidate is a red-eye candidate, and the method further comprising setting the detection conditions for a red-eye candidate of the second region to be stricter in the red-eye detection than those of the first region, and setting the detection conditions of a face region of the first region to be stricter in the face region detection than those of the second region.

It is still also preferable that the image is divided into the first and second regions after the detecting of the particular region candidate and before the detecting of the face region of the person, in accordance with a detection result of the particular region candidate; and when a plurality of particular region candidates concentrate within a predetermined range of the image, the predetermined range is set as the first region.

The present invention also provides a particular-region detection apparatus for detecting a particular region from an image including a person as an object.

The apparatus comprises: candidate detection means for detecting a region of the image satisfying detection conditions for particular region candidates as the particular region candidate; face detection means for detecting a face region of the person satisfying the detection conditions for the face region of the person; specifying means for specifying the particular region candidate as a particular region to be detected, in a condition that the particular region candidate is included in the detected face region by the face detection means; region setting means for dividing the image into first and second regions at least before the detection of the face region of the person is executed, wherein at least one of the candidate detection means and the face detection means changes the detection conditions used between the first and second regions of the image upon detection.

In the apparatus, it is preferable that the region setting means divides the image into the first region and the second region before the detection of the particular region candidate is executed, and when the detection of the particular region candidate is executed, the detection conditions used for the detection are changed between the first and second regions of the image.

The particular region may comprise a red-eye region.

It is also preferable that the particular region candidate is a red-eye candidate, and the candidate detection means sets the detection conditions for a red-eye candidate of the second region to be stricter in red-eye detection than those of the first region, and the face detection means sets the detection conditions for a face region of the first region to be stricter in red-eye detection than those of the second region.

It is also preferable that the region setting means divides the image into the first region and the second region after the detection of the particular region candidate and before the detection of the face region of the person, in accordance with a detection result of the particular region candidate, and when a plurality of particular region candidates concentrate within a predetermined range of the image, the region setting means sets the predetermined range as the first region, and sets a portion other than the predetermined range as the second region.

The invention also provide a program for causing a computer to detect a particular region from a fed image including a person as an object, the program comprising the procedures of: causing calculating means of the computer to detect a region of the image satisfying detection conditions for particular region candidates as the particular region candidate; causing the calculating means to detect a face region of the person satisfying detection conditions for the face region of the person and to set the particular region candidate as a particular region to be detected, in a condition that the particular region candidate is included in the detected face region; and causing the calculating means to divide the image into first and second regions at least before the detection of the face region of the person, wherein the calculating means changes the detection conditions used for at least one of the detection of the particular region candidate and the detection of the face region of the person between the first and second regions of the image.

The particular region may comprise a red-eye region. In the program, it is preferable that the particular region candidate is a red-eye candidate; and when the red-eye candidate detection is executed, the detection conditions for a red-eye candidate of the second region are set to be stricter than those of the first region; and when the face detection is executed, the detection conditions for a face region of the first region are set to be stricter than those of the second region.

It is also preferable that the image is divided into the first region and the second region after the detection of the particular region candidates and before the detection of the face region of the person, in accordance with a detection result of the particular region candidate; and when a plurality of particular region candidates concentrate within a predetermined range of the image, the predetermined range is set as the first region and a portion other than the predetermined range is set as the second region by the calculating means.

With the configuration of the present invention, when a particular region such as a red eye or a pimple present in the face region of the image is detected, face detection in a region in which the particular region is not present is made unnecessary. Even when the particular region is likely to be present, a process time in a region of a low possibility can be shortened. Accordingly, it is possible to perform high speed detection of a particular region such as a red eye in the face region.

Thus, according to the particular-region detection method of the present invention, for example, high speed red-eye detection enables quick red-eye correction. For example, in the photoprinter that creates a photographic print from image data obtained by photoelectrically reading a photographic film, image data photographed by a digital camera, or the like, by limiting a drop in productivity to a minimum, it is possible to stably output a high image quality print of no red eyes.

DETAILED DESCRIPTION OF THE PREFERRED EMBODIMENT

The preferred embodiments of a method and apparatus for detecting a particular region, and a program therefor of the present invention will be described in detail with reference to the accompanying drawings.

In the description below, detection of a red eye as a particular region likely to be present in a face region of an image will be taken as an example. However, the present invention is not limited to this example.

Figure 1A:
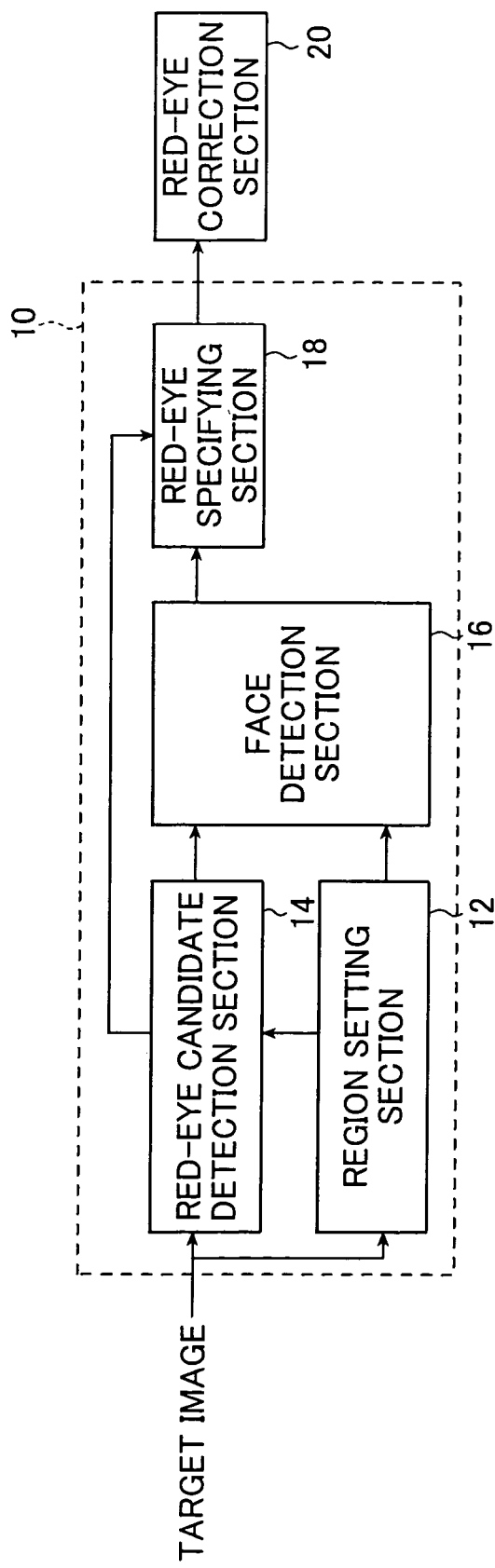
FIG. 1A is a block diagram conceptually showing an example of using a particular-region detection apparatus of the present invention for a red-eye detection apparatus.

FIG. 1A is a conceptual block diagram showing an example of a red-eye detection apparatus which uses the method and the apparatus for detecting a particular region of the present invention. The program therefor of the present invention is a program for executing a process described below.

A red-eye detection apparatus 10 (referred to as a detection apparatus 10, hereinafter) shown in FIG. 1A detects a red eye as a particular region from an input processing target image (its image data), and outputs the red eye to red-eye correction section 20. The apparatus 10 is configured by including region setting section 12, red-eye candidate detection section 14, face detection section 16, and red-eye specifying section 18. The detection apparatus 10 is configured by using a computer such as a personal computer or a work station, a digital signal processor (DSP), or the like as an example.

It is to be noted that the detection apparatus 10 and the red-eye correction section 20 may be constructed integrally, or the detection apparatus 10 (or red-eye correction section 20) may be incorporated in an image processor for performing various image processing operations such as color/density correction, gray-scale correction, electronic image expansion/reduction processing, and sharpness processing.

In the detection apparatus 10 of the present invention, there is no particular limitation on a processing target image (target image hereinafter) for red-eye detection as long as it is a color image. For example, an image photographed on a photographic film by a camera (image data obtained by photoelectrically reading a photographed image from a photographic film), or an image (image data) photographed by a digital camera may be used. Needless to say, the target image may be an image (image data) subjected to various image processing operations as occasion demands rather than a photographed image itself.

First, the target image is fed to the region setting section 12 and the red-eye candidate detection section 14.

The region setting section 12 sets a main portion region and a non-main portion region in the fed target image, and feeds a result of the setting (e.g., coordinate data or the like indicating pixel numbers or regions) to the red-eye candidate detection section 14 and the face detection section 16.

Figure 1D:
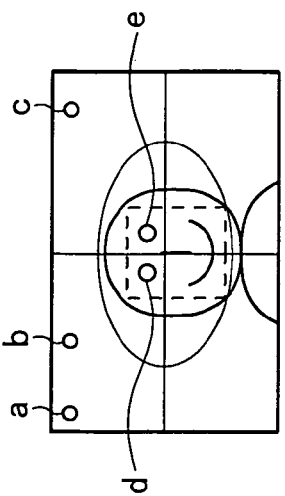
FIGS. 1B to 1D are conceptual diagrams illustrating red-eye detection according to the present invention.
Figure 1C:
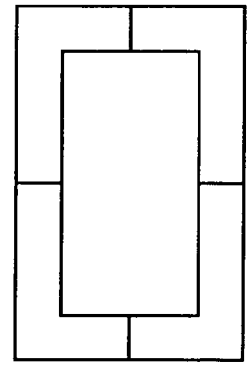
Figure 1B:
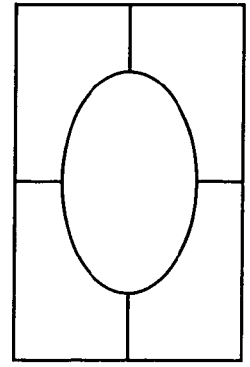

In the illustrated example, as an example, the region setting section 12 has a region setting template similar to that shown in each of FIGS. 1B and 1C. The region setting region 12, if necessary, expands/reduces the template (or target image), matches the template with the target image, sets an image center region (center elliptic region in FIG. 1B, and center rectangular region in FIG. 1C) as a main portion region and other regions as non-main portion regions, and sends a result of the setting to the red-eye candidate detection section 14 and the face detection section 16.

It is to be noted that in place of expansion/reduction of the template, templates of plural sizes may be prepared in accordance with expected sizes of target images, or the preparation of templates of plural sizes and expansion/reduction may be used together.

There is no particular limitation on methods of determining an image center region as a main portion region. A method may be properly decided in accordance with propriety required of the detection apparatus 10. For example, a process time of red-eye detection is longer as a main portion region is larger. However, accuracy of red-eye detection for the entire image is increased. Thus, a method of determining an image center region as a main portion region may be properly employed in accordance with a process time and processing accuracy required by the detection apparatus 10.

Additionally, a plurality of templates different from one another in sizes of image center regions set as main portion regions may be prepared and selected, and/or an image center region as a main portion region may be optionally changeable in a predetermined template.

According to the present invention, the method of setting a main portion region and a non-main portion region is not limited to the method of setting in the center and peripheral regions of the image. Various methods may be used.

An example thereof is a method of performing image analysis to set a focused region as a main portion region and other regions as non-main portion regions. It is to be noted that extraction of the focused region of the image may be carried out by a well-known method.

In general, including the case of stroboscopic photographing by a camera, a region corresponding to a main portion of the image is often higher in luminance than a background region. By utilizing this, a high-luminance region exceeding a threshold value in the image may be set as a main portion region, and other regions may be set as non-main portion regions. Alternatively, guide number, irradiation region of a strobe, focal distance or measuring distance information of the camera may be obtained from various pieces of information recorded on an image film, or magnetic information recorded on a film in the case of an APS (Advanced Photo System), a region irradiated with a strobe light may be set as a main portion region while other regions not irradiated with strobe lights may be set as non-main portion regions.

Furthermore, a region in which red-eye candidate regions detected by the red-eye candidate detection section 14 concentrate may be set as a main portion region corresponding to face detection described below. This will be detailed later.

The red-eye candidate detection section 14 detects a region likely to be a red eye, i.e., a red-eye candidate, from the target image, and feeds positional information of the red-eye candidate (coordinate positional information of a center), region information, information of a number of candidates, and the like as red-eye candidate information to the face detection section 16 and the red-eye specifying section 18.

For example, as shown in FIG. 1D, a person is photographed in a scene having three red lamps on the background. In the case of an image (scene) in which a red-eye phenomenon occurs in the person, a to c corresponding to the red lamps, and regions indicated by d and e corresponding to red eyes are detected as red-eye candidates, and fed to the face detection section 16 and the red-eye specifying section 18.

There is no particular limitation on methods of detecting red-eye candidates. Various well-known methods may be used.

An example thereof is a method of extracting a region in which a hue is red and pixels congregate by a predetermined number or more, and detecting a region of degrees of a red eye (how much a color is like a red eye) and circularity (how much a shape is round) exceeding threshold values as a red-eye candidate likely to be a red eye by using preset degrees of a red eye and circularity from many red-eye image samples.

Here, in the illustrated detection apparatus 10, conditions for red-eye candidate detection are changed between the main and non-main portion regions preset by the region setting section 12.

For example, even a region less likely to be a red eye is detected as a red-eye candidate in the main portion region, while only a region highly likely to be a red eye is detected as a red-eye candidate in the non-main portion region. Specifically, as described above, when a region in which degrees of a red eye and circularity exceed threshold values is detected as a red-eye candidate, red-eye candidate detection is carried out by reducing the threshold value in the main portion region. Conversely, red-eye candidate detection may be carried out by increasing the threshold value of the non-main portion region. Thus, for example, in the example shown in FIG. 1D, the red-eye candidates d and e of the main portion region are detected by a threshold value lower than that of the red-eye candidates a to c of the non-main portion region.

In the face detection section 16 described below, face detection is performed only around the red-eye candidates. Accordingly, a face detection process in the non-main portion region of low importance is reduced, i.e., the amount of face detection processing carried out by the face detection section 16 is reduced, making it possible to shorten a process time of red-eye detection.

The detection result of the red-eye candidate by the red-eye candidate detection section 14 and the setting result of the main and non-main portion regions by the region setting section 12 are sent to the face detection section 16.

The face detection section 16 executes face detection on the periphery of the red-eye candidate including the red-eye candidate detected by the red-eye candidate detection section 14 based on the red-eye detection result (e.g., the positional information), and feeds information of the red-eye candidate in which a face is detected in a region including itself or a face detection result in addition to the information to the red-eye specifying section 18.

For example, in the example shown in FIG. 1D, face detection operations are sequentially performed in predetermined regions including the red-eye candidates in correspondence with the red-eye candidates a to e. Thus, for example, a region surrounded with a dotted line is detected as a face region. Accordingly, the face detection section 16 feeds information that the red-eye candidates d and e are red-eye candidates included in the face region, or information of the detected face region to the red-eye specifying section 18.

As described above, the face detection is a process which takes much time. In the conventional red-eye detection, red-eye detection is executed in a detected face region after face detection is carried out. Thus, face detection is carried out even in a region having no red eyes, resulting in a very long face detection time.

On the other hand, according to the present invention, as described above, face detection is carried out only in a predetermined region including a red-eye candidate after the red-eye candidate is detected. Thus, useless face detection in a region having no red eyes is eliminated, making it possible to greatly shorten the time of face detection in red-eye detection.

There is no particular limitation on face detection methods of the face detection section 16. Various well-known methods may be used.

An example thereof is a method of performing face detection by using an average face image precreated from many face image samples, i.e., a template of a face (face template hereinafter).

Figure 2A:
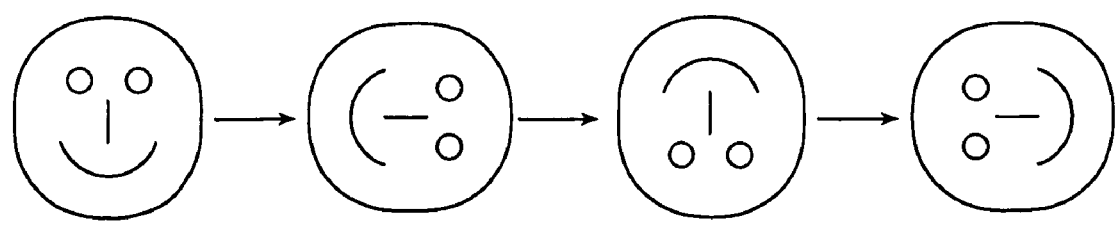
FIGS. 2A and 2B are conceptual diagrams illustrating a face detection method.
Figure 2B:
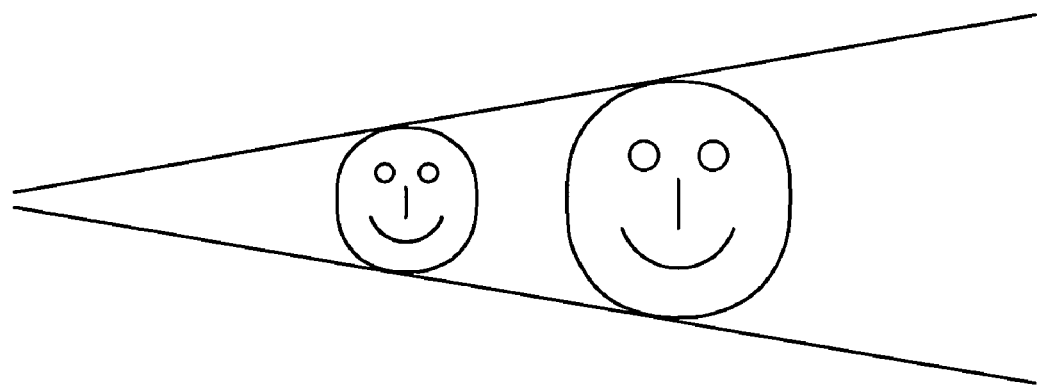

According to this method, for example, in accordance with a camera orientation during photographing such as a vertically oriented position (portray photographing)/horizontally oriented position (landscape photographing), the face template (or target image) is rotated in vertical and left-and-right directions (rotated in order of 0°→90°→180°→270° on an image screen) to change face directions as shown in FIG. 2A. Further, in accordance with a face size (resolution) in the image, a face size of a face template (or target image) shown in FIG. 2B is changed (expansion/reduction=resolution conversion), and face templates of combinations of various face directions and sizes are sequentially matched with face candidate regions in the image with confirmation of matching degree, to execute face detection.

It is to be noted that in place of rotating and expanding/reducing the face template, rotated face templates or expanded/reduced face templates may be prepared first, and matching may be executed by using these face templates. Additionally, face candidate region detection may be carried out by, e.g., processing such as flesh color extraction or edge extraction of the face.

Face detection that uses a learning method is also suitably used.

According to this method, many face images and non-face images are prepared, and feature amounts of the faces are extracted. Then, by using a properly selected learning method (e.g., Boostong), pre-learning is carried out by calculating a function or a threshold value for distinguishing a face from a non-face from a result of the extraction. When face detection is performed, a feature amount is extracted from a target image as in the case of the pre-learning, and a face or a non-face is judged by using a function or a threshold value obtained in the pre-learning to execute face detection.

Furthermore, it is possible to use methods disclosed in JP 8-184925 A and JP 9-138471 A, which combine shape recognition by edge (line) extraction or edge-direction extraction with color extraction such as flesh color extraction or black color extraction, and the methods described as face candidate detection methods other than the matching based on the face template in JP 2000-137788 A, JP 2000-148980 A, and JP 2000-149018 A.

Here, according to the present invention, the face detection section 16 performs face detection under conditions different between the main and non-main portion regions set by the region setting section 12. For example, in the example of FIG. 1D, for the red-eye candidates d and e located in the main portion region, highly accurate face detection without any erroneous detection or any omission of the detection is carried out even if a process time is slightly longer. On the other hand for the red-eye candidates a to c located in the non-main portion region, face detection is carried out to enable high speed processing.

Alternatively, a method that executes face detection only in the main portion region but not in the non-main portion region can be used.

Thus, by performing highly accurate face detection in the main portion region and high speed face detection in the non-main portion region, or no face detection in the non-main portion region, together with the effect of the red-eye candidate detection under the conditions changed between the main and non-main portion regions, it is possible to perform very high speed and highly accurate red eye detection in the important main portion region.

This red-eye detection has a possibility that a red eye may not be properly detected in the peripheral region set as the non-main portion region. However, a main object is ordinarily present in the center of the image. Thus, there will be few image quality problems.

There is no particular limitation on a difference of face detection conditions between the main and non-main portion regions. Various modes can be used.

An example thereof is a method of setting a high threshold for judging presence or absence of no faces based on a degree of a flesh color, circularity, or matching with a face template in the non-main portion region (or method of setting a low threshold value in the main portion region). According to this method, it is possible to shorten a face detection time in the non-main portion region while executing highly accurate face extraction in the main portion region.

In the case of face detection or the like by the matching using the face template, suitably used is a method that executes face detection corresponding to all face sizes in the main portion region and in the non-main portion region execute face detection only corresponding to a predetermined face size, such as face detection only for a standard face size or only for a predetermined face size or more.

It is suitable to change face detection methods between the main and non-main portion regions.

An example thereof is a method of performing face detection by the matching using the template or using the learning method which enables highly accurate face detection in the main portion region, and performing face detection based on the shape recognition by flesh color extraction or edge extraction, flesh color extraction, and the like processed within a short time in the non-main portion region as disclosed in JP 8-184925 A or JP 9-138471 A. Alternatively, in the non-main portion region, face detection may be performed only based on the shape recognition by edge extraction or only based on flesh color detection.

As described above, the detection result of the red-eye candidates by the red-eye candidate detection section 14, and the red-eye candidates whose faces are detected by the face detection section 16 are fed to the red-eye specifying section 18.

By using the information, the red-eye specifying section 18 specifies the red-eye candidates around which the faces are detected as red eyes, and feeds positional information of the red eyes, information of a red-eye region, information of the number of red eyes, or the like as a red-eye detection result in the target image to the red-eye correction section 20.

In accordance with the red-eye detection result fed from the red-eye specifying section 18, the red-eye correction section 20 executes image processing of the red-eye region of the target image to correct the red eyes of the target image.

There is no particular limitation on red-eye correction methods, and various well-known methods may be used. Examples thereof include a correction process of correcting a red eye by controlling chroma, brightness, a hue, or the like of a red-eye region in accordance with an image feature amount or the like of the red eye or a red-eye surrounding area (it may include a face surrounding area), and a correction process of simply converting a color of the red-eye region into black, for example.

Figure 3:
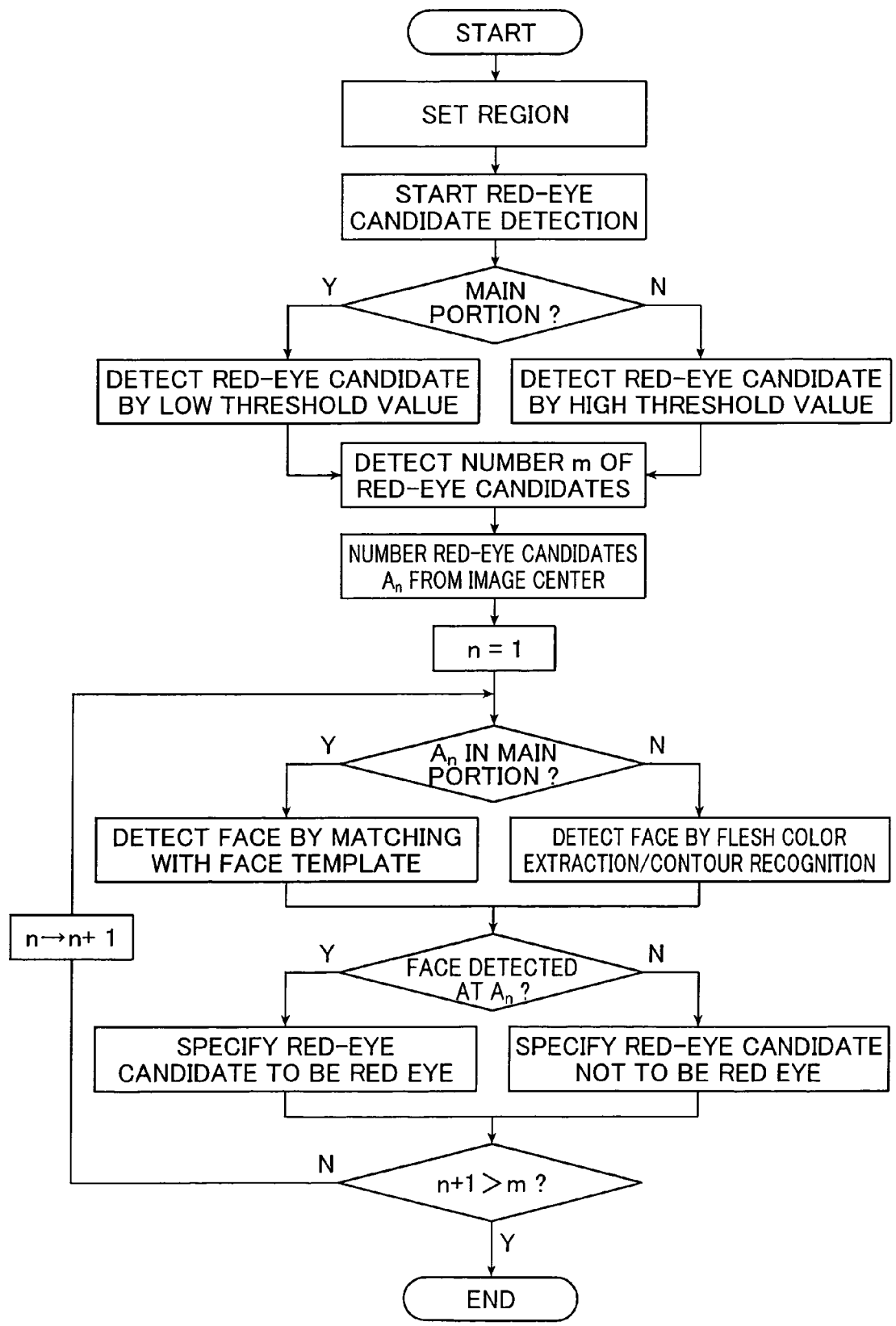
FIG. 3 is a flowchart of an example of red-eye detection in the red-eye detection apparatus shown in FIG. 1A.

Hereinafter, referring to a flowchart of FIG. 3, the present invention will be described more in detail by giving detailed explanation of the red-eye detection.

When a target image is fed and red-eye detection is started, as described above, first, the region setting section 12 sets main and non-main portion regions of the image, and feeds a result of the setting to the red-eye candidate detection section 14 and the face detection section 16.

Next, red-eye candidate detection is started by the red-eye candidate detection section 14. For the red-eye candidate detection, in accordance with the region setting by the region setting section 12, red-eye candidate detection is carried out by a low threshold value in the main portion region as described above to detect even a region less likely to be a red eye as a red-eye candidate region, and red-eye candidate detection is carried out by a high threshold value in the non-main portion region to detect only a region highly likely to be a red eye as a red eye candidate region.

Even if m red-eye candidates in total are detected, the red-eye candidate detection section 14 performs sequential numbering from a red-eye candidate region near a center of the image ($A_n$: n is a natural number of 1 or more to m or less), and sends a result of the red-eye candidate detection to the face detection section 16 and the red-eye specifying section 18.

The face detection section 16 that has received the result of the red-eye candidate detection judges whether a first (n=1) red-eye candidate ($A_n$ point) is a main portion region or a non-main portion region in accordance with the region setting by the region setting section 12. For example, if the red-eye candidate is a main portion region, face detection is carried out based on matching using the face template which enables highly accurate face detection. If the red-eye candidate is a non-main portion region, face detection is carried out based on contour recognition by flesh color extraction and edge extraction which enables high speed processing.

The face detection section 16 that has executed the face detection at the $A_n$ point sends information regarding success of the face detection at the $A_n$ point to the red-eye specifying section 18.

In accordance with a result of the face detection, the red-eye specifying section 18 specifies the red-eye candidate as a red eye when the face detection succeeds at the $A_n$ point, and not as a red eye when the face detection fails at the $A_n$ point.

After the end of specifying the red eye or not the red eye at the $A_n$ point, if (n+1)>m (m is a predetermined natural number) is not set, n is changed to n+1, and face detection is carried out at a next $A_n$ point (red-eye candidate). Thereafter, similarly, face detection operations are sequentially carried out for subsequent red-eye candidates. At a point of time of reaching (n+1)>m, i.e., face detection operations are completed for all the red-eye candidates, the red-eye detection is finished.

In the example, the red-eye candidate detection section 14 and the face detection section 16 (red-eye candidate detection and face detection) perform the red-eye detection and the face detection in accordance with the fixed main and non-main portion regions. However, the present invention is not limited to this, and main and non-main portion regions different in position and size between the red-eye candidate detection section 14 and the face detection section 16 may be set.

Figure 4:
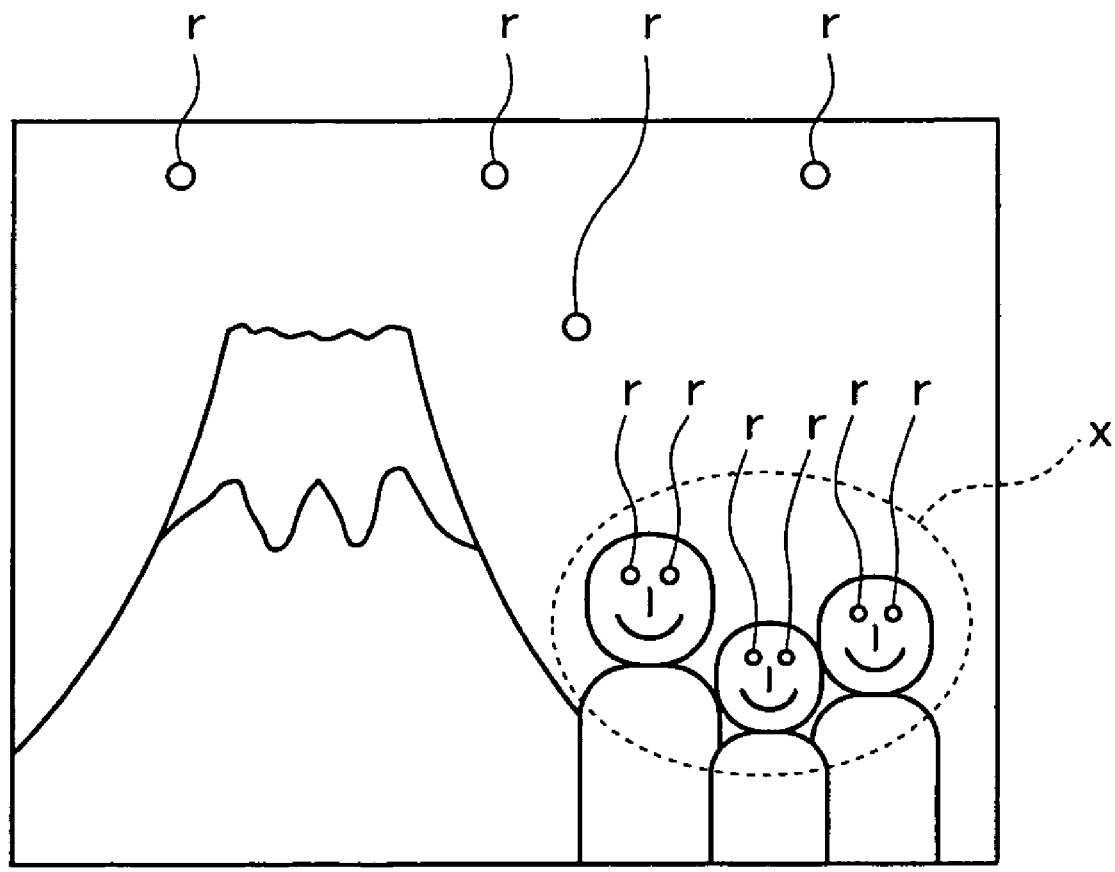
FIG. 4 is a conceptual diagram showing another example of red-eye detection according to the present invention.

For example, the red-eye candidate detection section 14 performs red-eye candidate detection by using the template shown in FIG. 1B or 1C and setting an image center as a main portion region, or performs red-eye candidate detection in all regions under the same conditions without setting any main portions. Next, in accordance with a result of the red-eye candidate detection, the face detection section 16 may perform face detection by setting a peripheral region x including a region in which red-eye candidates r concentrate as a main portion region and others as non-main portion regions as shown in FIG. 4.

In this case, for example, the red-eye candidate detection section 14 feeds the result of the red-eye candidate detection to the region setting section 12. The region setting section 12 needs to set a circular, elliptic, or rectangular region including the region in which the red-eye candidates concentrate as a main portion region.

Additionally, the red-eye candidate detection section 14 may perform red-eye candidate detection for the entire image under the same conditions (i.e., main portion region is not set), and the face detection section 16 may change the face detection conditions between the set main and non-main portion regions. Conversely, the red-eye candidate detection section 14 may change the red-eye candidate detection conditions between the set main and non-main portion regions, and the face detection section 16 may perform face detection for the detected red-eye candidates under the same conditions irrespective of regions.

The red-eye detection method uses a program for executing a computer to detect a red-eye region as a particular region from a fed image including a person as an object.

Specifically, the program includes a procedure of causing a calculating unit of the computer to detect red-eye candidates which satisfy detection conditions for candidates of red eyes, a procedure of causing the calculating unit of the computer to detect a face region of a person which satisfies detection conditions for becoming a face region of a person in a region including the detected red-eye candidates and to set the red-eye candidates included in the region of the detected face region as detection target red-eye regions, and a procedure of causing the calculating unit of the computer to divide the image into first and second regions (main and non-main portion regions) at least before the face region of the person is detected. The calculating unit of the computer is caused to change detection conditions used for at least one of the detection of the red-eye candidates and the detection of the face region of the person between the first and second regions of the image.

The method and apparatus for detecting a particular region, and the program therefor of the present invention have been described in detail. However, the embodiments are in no way limitative of the present invention, and needless to say, various improvements and modifications can be made without departing from the gist of the present invention.

For example, the embodiment is the application of the detection method of the present invention to the red-eye detection. However, the present invention is not limited to this, and various objects likely to be present in a face region of an image such as eyes, eye corners, eyebrows, a mouth, a nose, glasses, pimples, moles, and wrinkles may be applicable as particular regions. For example, pimple candidates may be detected from the image, face detection may be performed in a region around the pimple candidates, and pimple candidates around which a face is detected may be specified as pimples.

As a detection method of the particular region candidates in this case, for example, a method of detecting a region having a color or a shape intrinsic to a detection target particular region from an image may be employed. As in the case of the face detection, a method of performing matching by using an average particular region image (template) precreated from many image samples of detection target particular regions may suitably be used. An example thereof is a method of performing matching to detect eye corners by using an average eye corner image precreated from many eye corner image samples, i.e., an eye corner template.

What is claimed is:

1. A particular-region detection method of detecting a particular region from an image including a person as an object, comprising:

detecting a region of the image satisfying detection conditions for particular region candidates as a particular region candidate;

detecting a face region of the person satisfying detection conditions for the face region of the person and specifying the particular region candidate as a particular region to be detected, in a condition that the particular region candidate is included in the detected face region; and dividing the image into first and second regions at least before said detecting of the face region of the person, wherein at least one of said detecting of the particular region candidate and said detecting of the face region of the person comprises changing the detection conditions used in said detecting between the first and second regions of the image, and at least one of the detecting a region, detecting a face region and dividing the image is performed by a particular-region detection apparatus.

2. The particular-region detection method according to claim 1, wherein:

the image is divided into the first and second regions before said detecting of the particular region candidate; and said detecting of the particular region candidate comprises changing the detection conditions used in said detecting between the first and second regions of the image.

3. The particular-region detection method according to claim 1, wherein the particular region comprises a red-eye region.

4. The particular-region detection method according to claim 1, wherein:

the first region comprises a predetermined center region of the image; and the second region comprises a peripheral region located around the center region.

5. The particular-region detection method according to claim 1, wherein:

the first region is set in a focused region; and the second region is set in an unfocussed region.

6. The particular-region detection method according to claim 1, wherein:

the first region is set in a region in which luminance of the image exceeds a threshold value; and the second region is set in a region in which luminance of the image is equal to or less than the threshold value.

7. The particular-region detection method according to claim 2, wherein the particular region candidate is a red-eye candidate, and the method further comprising setting the detection conditions for a red-eye candidate of the second region to be stricter in the red-eye detection than those of the first region, and setting the detection conditions of a face region of the first region to be stricter in the face region detection than those of the second region.

8. The particular-region detection method according to claim 1, wherein:

the image is divided into the first and second regions after said detecting of the particular region candidate and before said detecting of the face region of the person, in accordance with a detection result of the particular region candidate; and when a plurality of particular region candidates concentrate within a predetermined range of the image, the predetermined range is set as the first region.

9. A particular-region detection apparatus for detecting a particular region from an image including a person as an object, comprising:

candidate detection means for detecting a region of the image satisfying detection conditions for particular region candidates as a particular region candidate;

face detection means for detecting a face region of the person satisfying the detection conditions for the face region of the person;

specifying means for specifying the particular region candidate as a particular region to be detected, in a condition that the particular region candidate is included in the detected face region by said face detection means;

region setting means for dividing the image into first and second regions at least before the detection of the face region of the person is executed, wherein at least one of said candidate detection means and said face detection means changes the detection conditions used between the first and second regions of the image upon detection.

10. The particular-region detection apparatus according to claim 9, wherein said region setting means divides the image into the first region and the second region before the detection of the particular region candidate is executed, and when the detection of the particular region candidate is executed, the detection conditions used for the detection are changed between the first and second regions of the image.

11. The particular-region detection apparatus according to claim 9, wherein the particular region comprises a red-eye region.

12. The particular-region detection apparatus according to claim 10, wherein the particular region candidate is a red-eye candidate, and said candidate detection means sets the detection conditions for a red-eye candidate of the second region to be stricter in red-eye detection than those of the first region, and said face detection means sets the detection conditions for a face region of the first region to be stricter in red-eye detection than those of the second region.

13. The particular-region detection apparatus according to claim 9, wherein said region setting means divides the image into the first region and the second region after the detection of the particular region candidate and before the detection of the face region of the person, in accordance with a detection result of the particular region candidate, and when a plurality of particular region candidates concentrate within a predetermined range of the image, said region setting means sets the predetermined range as the first region, and sets a portion other than the predetermined range as the second region.

14. A computer-readable medium embodied with a program for causing a computer to detect a particular region from a fed image including a person as an object, the program comprising:

causing a calculating means of the computer to detect a region of the image satisfying detection conditions for particular region candidates as the particular region candidate;

causing the calculating means to detect a face region of the person satisfying detection conditions for the face region of the person and to set the particular region candidate as a particular region to be detected, in a condition that the particular region candidate is included in the detected face region; and causing the calculating means to divide the image into first and second regions at least before the detection of the face region of the person, wherein the calculating means changes the detection conditions used for at least one of the detection of the particular region candidate and the detection of the face region of the person between the first and second regions of the image.

15. The computer-readable medium according to claim 14, wherein the particular region comprises a red-eye region.

16. The computer-readable medium according to claim 14, wherein:

the particular region candidate is a red-eye candidate; and when the red-eye candidate detection is executed, the detection conditions for a red-eye candidate of the second region are set to be stricter than those of the first region; and when the face detection is executed, the detection conditions for a face region of the first region are set to be stricter than those of the second region.

17. The computer-readable medium according to claim 14, wherein:

the image is divided into the first region and the second region after the detection of the particular region candidates and before the detection of the face region of the person, in accordance with a detection result of the particular region candidate; and when a plurality of particular region candidates concentrate within a predetermined range of the image, the predetermined range is set as the first region and a portion other than the predetermined range is set as the second region by the calculating means.

* * * * *